United States Patent [19]

Lin et al.

[11] Patent Number: 5,458,661
[45] Date of Patent: Oct. 17, 1995

[54] FUEL COMPOSITIONS

[75] Inventors: Jiang-Jen Lin; Sarah L. Weaver, both of Houston, Tex.

[73] Assignee: Shell Oil Company, Houston, Tex.

[21] Appl. No.: 308,716

[22] Filed: Sep. 19, 1994

[51] Int. Cl.$^6$ .................................. C10L 1/18; C10L 1/22
[52] U.S. Cl. ................................. 440/418; 564/176
[58] Field of Search ...................... 44/418, 424; 564/176

[56] References Cited

U.S. PATENT DOCUMENTS

| | | |
|---|---|---|
| 3,438,757 | 4/1969 | Honnen et al. . |
| 3,574,576 | 4/1971 | Honnen et al. . |
| 3,753,670 | 8/1973 | Strang et al. . |
| 3,756,793 | 9/1973 | Robinson . |
| 4,160,648 | 7/1979 | Lewis et al. . |
| 4,191,537 | 3/1980 | Lewis et al. . |
| 4,231,759 | 11/1980 | Udelhofen et al. . |
| 4,236,020 | 11/1980 | Lewis et al. . |
| 4,270,930 | 6/1981 | Campbell et al. . |
| 4,288,612 | 9/1981 | Lewis et al. . |
| 4,612,335 | 9/1986 | Cuscurida et al. . |
| 4,810,261 | 3/1989 | Sung et al. . |
| 4,852,993 | 8/1989 | Sung et al. . |
| 4,881,945 | 11/1989 | Buckley, III . |
| 4,883,826 | 11/1989 | Marugg et al. . |
| 4,936,868 | 6/1990 | Johnson . |
| 4,968,321 | 11/1990 | Sung et al. . |
| 4,973,414 | 11/1990 | Nerger et al. . |
| 4,985,047 | 1/1991 | Sung et al. . |
| 5,061,291 | 10/1991 | Sung . |
| 5,123,932 | 6/1992 | Rath et al. . |
| 5,147,414 | 9/1992 | Power, III et al. . |
| 5,352,251 | 10/1994 | Lin et al. ................................. 44/418 |

*Primary Examiner*—Jacqueline V. Howard

[57] ABSTRACT

The present invention is directed to the use of aromatic amide-containing phenol alkoxylate compounds having a weight average molecular weight is greater than about 600 as additives in fuel compositions. The invention is also directed to the use of these compounds for decreasing intake valve deposits, controlling octane requirement and reducing octane requirement. The invention is still further directed to the aromatic amide-containing phenol alkoxylate compounds.

48 Claims, No Drawings

FUEL COMPOSITIONS

BACKGROUND OF THE INVENTION

1. Field of the Invention

The present invention relates to the use of aromatic amide-containing phenol alkoxylate compounds as additives in fuel compositions and the use of these compounds to decrease intake valve deposits, control octane requirement increases and reduce octane requirement. The present invention further relates to aromatic amide-containing phenol alkoxylate compounds.

2. Background

The accumulation of deposits on the intake valves of internal combustion engines presents a variety of problems. The accumulation of such deposits is characterized by overall poor driveability including hard starting, stalls, and stumbles during acceleration and rough engine idle.

Many additives are known which can be added to hydrocarbon fuels to prevent or reduce deposit formation, or remove or modify formed deposits, in the combustion chamber and on adjacent surfaces such as intake valves, ports, and spark plugs, which in turn causes a decrease in octane requirement.

Continued improvements in the design of internal combustion engines, e.g., fuel injection and carburetor engines, bring changes to the environment of such engines thereby creating a continuing need for new additives to control the problem of inlet system deposits and to improve driveability which is usually related to deposits.

It would be an advantage to have fuel compositions which would reduce the formation of deposits and modify existing deposits that are related to octane requirement increase and poor driveability in modern engines which burn hydrocarbon fuels.

SUMMARY OF THE INVENTION

The present invention is directed to the use of aromatic amide-containing phenol alkoxylate compounds as additives in fuel compositions comprising a major amount of a mixture of hydrocarbons in the gasoline boiling range and a minor amount of one or more aromatic amide-containing phenol alkoxylate compounds of Formula I:

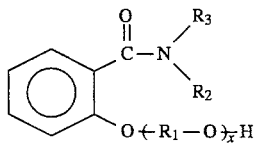

(I)

wherein each $R_1$ is independently selected from the group consisting of hydrocarbyl of 2 to 100 carbon atoms and substituted hydrocarbyl of 2 to 100 carbon atoms; x is from 1 to 50; $R_2$ and $R_3$ are each independently selected from the group consisting of hydrocarbyl of 1 to 100 carbon atoms, substituted hydrocarbyl of 1 to 100 carbon atoms and polyoxyalkylene alcohol of 2 to 200 carbon atoms with the proviso that at least one of $R_2$ and $R_3$ is polyoxyalkylene alcohol; and the weight average molecular weight of the additive compound is at least about 600.

The invention is also directed to the use of these aromatic amide-containing phenol alkoxylate compounds for decreasing intake valve deposits, controlling octane requirement increases and reducing octane requirement. The invention is still further directed to aromatic amide-containing phenol alkoxylate compounds.

DESCRIPTION OF THE PREFERRED EMBODIMENTS

Compounds

The compounds of the present invention, broadly expressed as aromatic amide-containing phenol alkoxylates, are a new class of additives useful for hydrocarbon fuels, e.g., fuels in the gasoline boiling range, for preventing deposits in engines. The compounds are also proposed for controlling octane requirement increases and reducing octane requirement. The compounds produce very little residue and are miscible with carriers and other detergents. Non-limiting illustrative embodiments of the compounds useful as additives in the instant invention include those of Formula I:

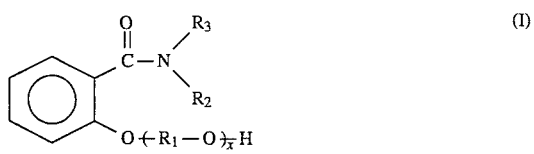

(I)

In Formula I, each $R_1$ is independently selected from the group consisting of hydrocarbyl of 2 to 100 carbon atoms and substituted hydrocarbyl of 2 to 100 carbon atoms. As used herein, the term "hydrocarbyl" represents a radical formed by the removal of one or more hydrogen atoms from a carbon atom of a hydrocarbon (not necessarily the same carbon atom). Useful hydrocarbyls are aliphatic, aromatic, substituted, unsubstituted, acyclic or cyclic. Preferably, the hydrocarbyls are aryl, alkyl, alkenyl or cycloalkyl and are straight-chain or branched-chain. Representative hydrocarbyls include methyl, ethyl, butyl, pentyl, methylpentyl, hexenyl, ethylhexyl, dimethylhexyl, octamethylene, octenylene, cyclooctylene, methylcyclooctylene, dimethylcyclooctyl, isooctyl, dodecyl, hexadecenyl, octyl, eicosyl, hexacosyl, triacontyl and phenylethyl. As noted, the hydrocarbyls utilized may be substituted. As used herein, the term "substituted hydrocarbyl" refers to any "hydrocarbyl" which contains a functional group such as carbonyl, carboxyl, nitro, amino, hydroxy (e.g. hydroxyethyl), oxy, cyano, sulfonyl, and sulfoxyl. The majority of the atoms, other than hydrogen, in substituted hydrocarbyls are carbon, with the heteroatoms (i.e., oxygen, nitrogen, sulfur) representing only a minority, 33% or less, of the total non-hydrogen atoms present.

Preferably each $R_1$ is independently hydrocarbyl or substituted hydrocarbyl of 2 to 50 carbon atoms, more preferably of 2 to 20 carbon atoms. Preferred compounds are those in which each $R_1$ is independently selected from hydrocarbyl of 2 to 20 carbon atoms, especially alkyl of 2 to 4 carbon atoms, and more especially 4 carbon atoms. When $R_1$ is hydrocarbyl of a relatively high number of carbon atoms, i.e., greater than about 50 carbon atoms, $R_1$ will be represented by polymeric hydrocarbyls derived from polyisobutylene, polybutene, polypropylene or polyalphaolefin.

Particularly preferred compounds of Formula I are those in which $R_1$ is hydrocarbyl (geminal or vicinal) of formula:

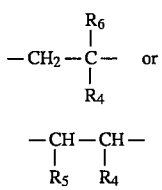

wherein $R_4$, $R_5$ and $R_6$ are each independently selected from the group consisting of hydrogen, hydrocarbyl, as defined hereinbefore, of 1 to 98 carbon atoms and substituted hydrocarbyl, as defined hereinbefore, of 1 to 98 carbon atoms. Preferred $R_4$, $R_5$ and $R_6$ groups are hydrogen, hydrocarbyl of 1 to 18 carbon atoms and substituted hydrocarbyl of 1 to 18 carbon atoms. In addition, $R_5$ and $R_4$, or alternatively $R_4$ and $R_6$, may be taken together to form a divalent linking hydrocarbyl group of 3 to 12 carbon atoms.

The most preferred compounds of Formula I are those in which $R_1$ is hydrocarbyl as represented by Formula II above wherein $R_6$ is hydrogen and each $R_4$ is independently selected from hydrogen, alkyl of 1 to 18 carbon atoms or oxy-substituted hydrocarbyl of 1 to 18 carbon atoms, particularly those compounds where $R_6$ is hydrogen and each $R_4$ is independently hydrogen or alkyl of 1 to 2 carbon atoms, especially those compounds where $R_6$ is hydrogen and $R_4$ is alkyl of two carbon atoms.

When $R_4$ is oxy-substituted hydrocarbyl of 1 to 18 carbon atoms, $R_4$ is preferably an alkoxy-substituted alkylene of 1 to 18 carbon atoms or an aryloxy-substituted alkylene of 1 to 18 carbon atoms. Particularly preferred alkoxy-substituted alkylene groups include ethylhexyleneoxymethylene, isopropoxymethylene, butoxymethylene and mixtures thereof. Particularly preferred aryl-substituted alkylene groups include nonylphenoxymethylene, phenoxymethylene and mixtures thereof.

In Formula I above, x is from 1 to 50, preferably from 1 to 40, even more preferably from 1 to 26 and most preferably from 1 to 13. Those of ordinary skill in the art will recognize that when the compounds of Formula I are used in a composition, x will not have a fixed value but will instead be represented by a range of different values. As used in this specification, x is considered to be a (number) average of the various values of x that are found in a given composition, which number has been rounded to the nearest integer. The range of x was determined by the gel permeation chromatography (GPC) analysis in the various examples and is indicated by the polydispersity (polydispersity=molecular weight based on the weight average divided by the molecular weight based on the number average).

When x is greater than 1, the individual $R_1$'s are the same or different. For example, if x is 20, each $R_1$ can be alkyl of four carbon atoms. Alternatively, the $R_1$'s can differ and for instance, independently be alkyl of two to four carbon atoms. When the $R_1$'s differ, they may be present in blocks, i.e., all x groups in which $R_1$ is alkyl of three carbon atoms will be adjacent, followed by all x groups in which $R_1$ is alkyl of two carbon atoms, followed by all x groups in which $R_1$ is alkyl of four carbon atoms. When the $R_1$'s differ, they may also be present in any random distribution.

$R_2$ and $R_3$ are each independently selected from the group consisting of hydrocarbyl, as defined hereinbefore, of 1 to 100 carbon atoms, substituted hydrocarbyl, as defined hereinbefore, of 1 to 100 carbon atoms and polyoxyalkylene alcohol of 2 to 200 carbon atoms with the proviso that at least one of $R_2$ and $R_3$ must be polyoxyalkylene alcohol.

When $R_2$ or $R_3$ is hydrocarbyl or substituted hydrocarbyl, it will preferably be selected from hydrocarbyl or substituted hydrocarbyl of 1 to 50 carbon atoms. When $R_2$ or $R_3$ are hydrocarbyl of a relatively high number of carbon atoms, i.e., greater than about 50 carbon atoms, $R_2$ or $R_3$ will be represented by polymeric hydrocarbyls derived from polyisobutylene, polybutene, polypropylene or poly-alphaolefin.

In the more preferred embodiments, when $R_2$ or $R_3$ is hydrocarbyl or substituted hydrocarbyl, $R_2$ or $R_3$ will preferably be selected from alkyl of 1 to 50 carbon atoms, aromatics of 6 to 50 carbon atoms and polyoxyalkyl of 1 to 50 carbon atoms. When $R_2$ or $R_3$ are alkyl, they will preferably be selected from alkyl of 1 to 20 carbon atoms, more particularly alkyl of 1 to 8 carbon atoms. When $R_2$ or $R_3$ are aromatic, they will preferably be an aromatic of 6 to 20 carbon atoms, more preferably of 6 carbon atoms. When $R_2$ or $R_3$ are polyoxyalkyl, they will preferably be polyoxyalkyl of Formula IV:

wherein each $R_7$ is independently selected from alkyl of 2 to 50 carbon atoms, $R_8$ is alkyl of 1 to 50 carbon atoms and y is from 1 to 50. Preferably when $R_2$ or $R_3$ are polyoxyalkyl of Formula IV, each $R_7$ is independently selected from alkyl of 2 to 20 carbon atoms, $R_8$ is alkyl of 1 to 10 carbon atoms and y is from 1 to 20, more preferably, each $R_7$ is independently selected from alkyl of 2 to 6 carbon atoms, $R_8$ is alkyl of 1 to 5 carbon atoms and y is from 1 to 10 and most preferably $R_7$ is 2 to 3 carbon atoms and $R_8$ is alkyl of 1 carbon atom and y is from 1 to 10.

When y is greater than 1, the individual $R_7$'s are the same or different. For example, if y is 20, each $R_7$ can be alkyl of four carbon atoms. Alternatively, the $R_7$'s can differ and for instance, independently be alkyl of two to four carbon atoms. When the $R_7$'s differ, they may be present in blocks, i.e., all y groups in which $R_7$ is alkyl of three carbon atoms will be adjacent, followed by all y groups in which $R_7$ is alkyl of two carbon atoms, followed by all y groups in which $R_7$ is alkyl of four carbon atoms. When the $R_7$'s differ, they may also be present in any random distribution.

As noted, at least one of $R_2$ and $R_3$ must be polyoxyalkylene alcohol of 2 to 200 carbon atoms. Preferably, both $R_2$ and $R_3$ are polyoxyalkylene alcohol. When both $R_2$ and $R_3$ are polyoxyalkylene alcohol, the polyoxyalkylene alcohols may be the same or different. When $R_2$ and/or $R_3$ are polyoxyalkylene alcohol, they are preferably polyoxyalkylene alcohol of Formula V:

wherein each $R_9$ is independently selected from the group consisting of hydrocarbyl, as defined hereinbefore, of 2 to 100 carbon atoms and substituted hydrocarbyl, as defined hereinbefore, of 2 to 100 carbon atoms and z is from 1 to 50. Preferably each $R_9$ is independently hydrocarbyl or substituted hydrocarbyl of 2 to 50 carbon atoms, more preferably of 2 to 20 carbon atoms. Preferred compounds are those in which each $R_9$ is independently selected from hydrocarbyl of 2 to 20 carbon atoms, preferably alkyl of 2 to 20 carbon atoms, more preferably alkyl of 2 to 4 carbon atoms and most preferably alkyl of 4 carbon atoms. When $R_9$ is hydrocarbyl of a relatively high number of carbon atoms, i.e., greater than about 50 carbon atoms, $R_9$ will be represented by polymeric hydrocarbyls derived from polyisobutylene, polybutene, polypropylene or poly-alphaolefin.

Particularly preferred compounds of Formula I are those in which when $R_2$ and/or $R_3$ are polyoxyalkylene alcohol of Formula V, $R_9$ is hydrocarbyl (geminal or vicinal) of formula:

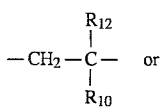

(VI)

or

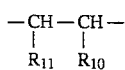

(VII)

wherein $R_{10}$, $R_{11}$ and $R_{12}$ are each independently selected from the group consisting of hydrogen, hydrocarbyl, as defined hereinbefore, of 1 to 98 carbon atoms and substituted hydrocarbyl, as defined hereinbefore, of 1 to 98 carbon atoms. Preferred $R_{10}$, $R_{11}$ and $R_{12}$ groups are hydrogen, hydrocarbyl of 1 to 18 carbon atoms and substituted hydrocarbyl of 1 to 18 carbon atoms. $R_{11}$ and $R_{10}$, or alternatively $R_{10}$ and $R_{12}$, may be taken together to form a divalent linking hydrocarbyl group of 3 to 12 carbon atoms.

The most preferred compounds of Formula I are those in which when $R_2$ and/or $R_3$ are polyoxyalkylene alcohol of Formula V, $R_9$ is hydrocarbyl as represented by Formula VI above wherein $R_{12}$ is hydrogen and $R_{10}$ is independently selected from hydrogen, alkyl of 1 to 18 carbon atoms or oxy-substituted hydrocarbyl of 1 to 18 carbon atoms, particularly those compounds where $R_{12}$ is hydrogen and $R_{10}$ is independently hydrogen or alkyl of 1 to 2 carbon atoms, especially those compounds where $R_{12}$ is hydrogen and $R_{10}$ is alkyl of two carbon atoms.

When $R_{10}$ is oxy-substituted hydrocarbyl of 1 to 18 carbon atoms, $R_{10}$ is preferably an alkoxy-substituted alkylene of 1 to 18 carbon atoms or an aryloxy-substituted alkylene of 1 to 18 carbon atoms. Particularly preferred alkoxy-substituted alkylene groups include ethylhexyleneoxymethylene, isopropoxymethylene, butoxymethylene and mixtures thereof. Particularly preferred aryl-substituted alkylene groups include nonylphenoxymethylene, phenoxymethylene and mixtures thereof.

In Formula V above, z is from 1 to 50, preferably from 1 to 40, even more preferably from 1 to 26 and most preferably from 1 to 13. Those of ordinary skill in the art will recognize that when the compounds of Formula I in which $R_2$ and/or $R_3$ are polyoxyalkylene alcohols of Formula II are used in a composition, z will not have a fixed value but will instead be represented by a range of different values. As used in this specification, z is considered to be a (number) average of the various values of z that are found in a given composition, which number has been rounded to the nearest integer. The range of z was determined by the gel permeation chromatography (GPC) analysis in the various examples and is indicated by the polydispersity (polydispersity=molecular weight based on the weight average divided by the molecular weight based on the number average).

When z is greater than 1, the individual $R_9$'s are the same or different. For example, if z is 20, each $R_9$ can be alkyl of four carbon atoms. Alternatively, the $R_9$'s can differ and for instance, independently be alkyl from two to four carbon atoms. When the $R_9$'s differ, they may be present in blocks, i.e., all z groups in which $R_9$ is alkyl of three carbon atoms will be adjacent, followed by all z groups in which $R_9$ is alkyl of two carbon atoms, followed by all z groups in which $R_9$ is alkyl of four carbon atoms. When the $R_9$'s differ, they may also be present in any random distribution.

In one preferred embodiment, either $R_2$ or $R_3$ is selected from hydrocarbyl of 1 to 100 carbon atoms and substituted hydrocarbyl of 1 to 100 carbon atoms and the remaining R group is polyoxyalkylene alcohol of Formula IV. When one of $R_2$ and $R_3$ is selected from hydrocarbyl of 1 to 100 carbon atoms and substituted hydrocarbyl of 1 to 100 carbon atoms and the remaining R group is polyoxyalkylene alcohol of Formula IV, preferably the sum of the values of x and z will not exceed 40, even more preferably, the sum of the values of x and z will not exceed 26. In an alternative preferred embodiment, both $R_2$ and $R_3$ will be polyoxyalkylene alcohol of Formula IV. When $R_2$ and $R_3$ are polyoxyalkylene alcohol of Formula IV, preferably the sum of the values of x and both z's (the z value for $R_2$ and $R_3$) will not exceed 40, even more preferably, the sum of the values of x and both z's will not exceed 26. In this preferred embodiment, preferably the value of x will be from 1 to 13 and the value of each z will be from 1 to 13.

The present invention is also directed to compounds of Formula I wherein $R_1$, $R_2$, $R_3$ and x are as defined hereinbefore.

The compounds of Formula I have a weight average molecular weight of at least about 600. Preferably, the weight average molecular weight is from about 800 to about 4000, even more preferably from about 800 to about 2000.

Typical compounds represented by Formula I and the corresponding initiators used to make these compounds include those listed by structure in Table 1. For purposes of clarity the hydrogens have been eliminated from the ring structures of the aromatic rings and the standard schematic structure for a benzene ring (without hydrogen and carbon atoms) has been used.

TABLE I

| Ex. # | Initiator | Final Product |
|---|---|---|
| 1 | ![structure] | ![structure] wherein x is from 1 to 26 and z is from 1 to 26. |

TABLE I-continued

| Ex. # | Initiator | Final Product |
|---|---|---|

2

Initiator: 2-hydroxy-N-(2-(2-hydroxyethoxy)ethyl)benzamide $$\text{salicyl-C(O)-N(H)-CH}_2\text{-CH}_2\text{-O-CH}_2\text{CH}_2\text{-O-H}$$

Final Product:

Structure with salicylamide core, N-substituted with $CH_2$-$CH_3$ and $(CH_2CHO)_z$-H branches, $CH_2$-$CH_2OCH_2CH_2O(CH_2CHO)_z$-H, ortho-O-$(CH_2$-$CHO)_z$-H with $CH_2$-$CH_3$ substituents.

wherein x is from 1 to 26 and each z is from 1 to 26.

3

Initiator: salicylamide (2-hydroxybenzamide, $-C(O)NH_2$, $-OH$)

Final Product: salicylamide core with N-($CH_2CHO)_z$-H / $CH_2$/$CH_3$ branch and ($CH_2CHO)_z$-H / $CH_2$-$CH_3$ branch; ortho-O-($CH_2$-$CHO)_x$-H with $CH_2$/$CH_3$.

wherein x is from 1 to 26 and each z is from 1 to 26.

4

Initiator: 2-hydroxy-N-octylbenzamide ($-C(O)-N(H)-C_8H_7$, $-OH$)

Final Product: salicylamide N-substituted with $(CH_2CHO)_z$-H/$CH_2$-$CH_3$ and $C_8H_{17}$; ortho-O-$(CH_2$-$CHO)_x$-H/$CH_2$/$CH_3$.

wherein x is from 1 to 26 and z is from 1 to 26.

5

Initiator: 2-hydroxy-N-phenylbenzamide ($-C(O)-N(H)-C_6H_5$, $-OH$)

Final Product: salicylanilide N-substituted with $(CH_2CHO)_z$-H/$CH_2$/$CH_3$ and phenyl; ortho-O-$(CH_2CHO)_x$-H/$CH_2$/$CH_3$.

wherein x is from 1 to 26 and z is from 1 to 26.

---

The compounds of Formula I are illustratively prepared by alkoxylation, i.e., reacting an initiator selected from salicylamide alcohols and salicylamides with epoxides in the presence of a potassium compound.

In one embodiment, the compounds of Formula I are prepared utilizing epoxides and salicylamide alcohol initiators represented by Formula VIII:

$$\text{(VIII)}$$

2-hydroxybenzamide with N-H and N-$(R_{13}O)_a$-H substitution.

wherein $R_{13}$ is selected from hydrocarbyl, as defined hereinbefore, of 2 to 100 carbon atoms and substituted hydrocarbyl, as defined hereinbefore, of 2 to 100 carbon atoms, and a is from 1 to 50. Preferably $R_{13}$ is alkyl of 2 to 50 carbon atoms, more preferably from 2 to 20 carbon atoms and even more preferably alkyl of 2 to 10 carbon atoms and a is from 1 to 20 and more preferably 1 to 10 carbon atoms.

Non-limiting examples of salicylamide alcohol initiators which are employed include N-hydroxyethyl salicylamide and N-hydroxyethoxyethyl salicylamide each of which are available commercially.

The salicylamide alcohol initiators utilized can also be prepared by any of the methods known and described in the art, such as by reacting an alkyl salicylate of Formula IX:

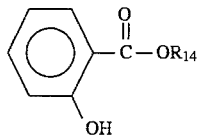   (IX)

with an aminoalcohol of Formula X:

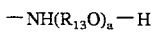   (X)

wherein $R_{13}$ and a are as defined hereinbefore and $R_{14}$ is selected from alkyl of 1 to 4 carbon atoms, preferably methyl or ethyl.

Illustrative alkyl salicylates for reacting with the aminoalcohols include ethyl salicylate and methyl salicylate. Those of ordinary skill in the art will recognize that the various isomers of the above alkyl salicylate may also be employed. Illustrative aminoalcohols for reacting with the alkyl salicylate to make the salicylamide alcohol initiators include: monoethanolamines and aminoethoxy ethanol.

The ratio of salicylate to aminoalcohol utilized in the preparation of the salicylate alcohol initiators may be varied over a wide range. Generally a molar ratio of 1:1 will be employed. In addition, the temperature of the reaction will generally range from 80° C. to the decomposition temperature of any of the reactants or the product. Preferably, the temperature will be above about 100° C., and more generally from about 110° C. to about 150° C.

In an alternative embodiment, the compounds of Formula I are prepared by reacting with epoxide the salicylamide initiators of Formula XI:

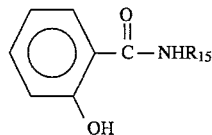   (XI)

wherein $R_{15}$ is selected from the group consisting of hydrogen, alkyl of 1 to 20 carbon atoms, aromatics of 6 to 10 carbon atoms and alkoxyalkyls wherein each alkyl group has 1 to 18 carbon atoms. Non-limiting examples of salicylamides which can be employed include N-3-methoxypropyl salicylamide and N-2-methoxyethyl salicylamide, with N-3-methoxypropyl salicylamide being the most preferred. Select salicylamide initiators of Formula XI are also available commercially, such as, Salicylamide (available commercially from Aldrich Chemical Company), Salicylanilide (available commercially from Aldrich Chemical Company).

The salicylamide initiators utilized can also be prepared by any of the methods known and described in the art, such as by reacting a salicylate of Formula XII:

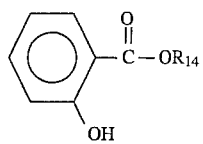   (XII)

with an amine of Formula XIII:

   (XIII)

wherein $R_{14}$ and $R_{15}$ are as defined hereinbefore. Those of ordinary skill in the art will recognize that the various isomers of the above alkyl salicylate may also be employed. Illustrative amines for reacting with the alkyl salicylate to make the salicylamide initiators of Formula XI include n-ocytlamine.

The one or more epoxides employed in the reaction with the initiators to prepare the compounds of Formula I contain from 2 to 100 carbon atoms, preferably from 2 to 50 carbon atoms, more preferably from 2 to 20 carbon atoms, even more preferably from 2 to 4 carbon atoms. The epoxides may be internal epoxides such as 2,3 epoxides of the formula:

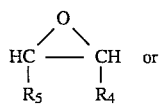   (XIV)

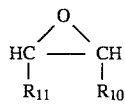   (XV)

wherein $R_4$, $R_5$, $R_{11}$ and $R_{10}$ are as defined hereinbefore or terminal epoxides such as 1,2 epoxides of the formula:

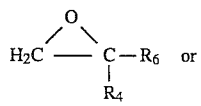   (XVI)

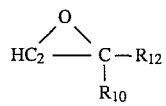   (XVII)

wherein $R_4$, $R_6$, $R_{10}$ and $R_{12}$ are as defined hereinbefore. (Note that Formulas XIV and XVI correspond to geminal and vicinal hydrocarbyls for $R_1$ while Formulas XV and XVII correspond to geminal and vicinal hydrocarbyls for $R_9$). In Formula XIV, $R_5$ and $R_4$ may be taken together to form a cycloalkylene epoxide or a vinylidene epoxide by forming a divalent linking hydrocarbyl group of 3 to 12 carbon atoms. The same may occur in Formula XV with regard to $R_{11}$ and $R_{10}$, in Formula XVI with regard to $R_4$ and $R_6$ and in Formula XVII with regard to $R_{10}$ and $R_{12}$.

When $R_4$, $R_5$, $R_6$, $R_{10}$, $R_{11}$ and/or $R_{12}$ are oxy-substituted hydrocarbyl, suitable compounds of Formulas XIV-XVII will include compounds such as nonylphenyl glycidyl ether, phenyl glycidyl ether, cresyl glycidyl ether, butyl glycidyl ether, alkyl $C_{12}$—$C_{13}$ glycidyl ether, alkyl $C_8$—$C_{10}$ glycidyl ether, 2-ethylhexyl glycidyl ether and isopropyl glycidyl ether.

In the preferred embodiment, the terminal epoxides represented by Formulas XVI and XVII are utilized. Ideally these terminal epoxides are 1,2-epoxyalkanes. Suitable 1,2-epoxyalkanes include 1,2-epoxyethane, 1,2-epoxypropane, 1,2-epoxybutane, 1,2-epoxydecane, 1,2-epoxydodecane, 1,2-epoxyhexadecane, 1,2-epoxyoctadecane and mixtures thereof.

In a typical preparation of Formula I compounds, the one or more epoxides and initiator are contacted at a ratio from about 7:1 to about 55:1 moles of epoxide per mole of initiator. Preferably, they are contacted at a molar ratio from about 10:1 to about 30:1, with the most preferred molar ratio being about 20:1.

The reaction is carried out in the presence of potassium compounds which act as alkoxylation catalysts. Such catalysts are conventional and include potassium methoxide, potassium ethoxide, potassium hydroxide, potassium hydride and potassium-t-butoxide. The preferred catalysts are potassium hydroxide and potassium-t-butoxide. The catalysts are used in a base stable solvent such as alcohol, ether or hydrocarbons. The catalysts are employed in a wide variety of concentrations. Generally, the potassium compounds will be used in an amount from about 0.02% to about 5.0% of the total weight of the mixture, preferably from about 0.1% to about 2.0% of the total weight of the mixture, and most preferably about 0.2% of the total weight of the mixture.

The reaction is conveniently carried out in a conventional autoclave reactor equipped with heating and cooling means. The process is practiced batchwise, continuously or semi-continuously.

The manner in which the alkoxylation reaction is conducted is not critical to the invention. Illustratively, the initiator and potassium compound are mixed and heated under vacuum for a period of at least 30 minutes. The one or more epoxides are then added to the resulting mixture, the reactor sealed and pressurized with nitrogen, and the mixture stirred while the temperature is gradually increased.

The temperature for alkoxylation is from about 80° C. to about 180° C., preferably from about 100° C. to about 150° C., and even more preferably from about 120° C. to about 140° C. The alkoxylation reaction time is generally from about 2 to about 20 hours, although longer or shorter times are employed.

Alkoxylation processes of the above type are known and are described, for example in U.S. Pat. Nos. 4,973,414, 4,883,826, 5,123,932 and U.S. Pat. No. 4,612,335, each incorporated herein by reference.

The product of Formula I is normally liquid and is recovered by conventional techniques such as filtration and distillation. The product is used in its crude state or is purified, if desired, by conventional techniques such as aqueous extraction, solid absorption and/or vacuum distillation to remove any remaining impurities.

Other methods for making the compounds of Formula I are known by those skilled in the art. For example, the compounds of Formula I are prepared by reacting an initiator as described hereinbefore with other cyclic ethers. In addition, other catalyst chemistry, such as the use of acidic catalysts, can be employed to achieve the compounds of Formula I.

Fuel Compositions

The compounds of Formula I are useful as additives in fuel compositions which are burned or combusted in internal combustion engines. The fuel compositions of the present invention comprise a major amount of a mixture of hydrocarbons in the gasoline boiling range and a minor amount of one or more of the compounds of Formula I. As used herein, the term "minor amount" means less than about 10% by weight of the total fuel composition, preferably less than about 1% by weight of the total fuel composition and more preferably less than about 0.1% by weight of the total fuel composition.

Suitable liquid hydrocarbon fuels of the gasoline boiling range are mixtures of hydrocarbons having a boiling range of from about 25° C. to about 232° C., and comprise mixtures of saturated hydrocarbons, olefinic hydrocarbons and aromatic hydrocarbons. Preferred are gasoline mixtures having a saturated hydrocarbon content ranging from about 40% to about 80% by volume, an olefinic hydrocarbon content from 0% to about 30% by volume and an aromatic hydrocarbon content from about 10% to about 60% by volume. The base fuel is derived from straight run gasoline, polymer gasoline, natural gasoline, dimer and trimerized olefins, synthetically produced aromatic hydrocarbon mixtures, or from catalytically cracked or thermally cracked petroleum stocks, and mixtures of these. The hydrocarbon composition and octane level of the base fuel are not critical. The octane level, (R+M)/2, will generally be above about 85.

Any conventional motor fuel base can be employed in the practice of the present invention. For example, hydrocarbons in the gasoline can be replaced by up to a substantial amount of conventional alcohols or ethers, conventionally known for use in fuels. The base fuels are desirably substantially free of water since water could impede a smooth combustion.

Normally, the hydrocarbon fuel mixtures to which the invention is applied are substantially lead-free, but may contain minor amounts of blending agents such as methanol, ethanol, ethyl tertiary butyl ether, methyl tertiary butyl ether, and the like, at from about 0.1% by volume to about 15% by volume of the base fuel, although larger amounts may be utilized. The fuels can also contain conventional additives including antioxidants such as phenolics, e.g., 2,6-di-tertbutylphenol or phenylenediamines, e.g., N,N'-di-sec-butyl-p-phenylenediamine, dyes, metal deactivators, dehazers such as polyester-type ethoxylated alkylphenol-formaldehyde resins. Corrosion inhibitors, such as a polyhydric alcohol ester of a succinic acid derivative having on at least one of its alpha-carbon atoms an unsubstituted or substituted aliphatic hydrocarbon group having from 20 to 500 carbon atoms, for example, pentaerythritol diester of polyisobutylene-substituted succinic acid, the polyisobutylene group having an average molecular weight of about 950, in an amount from about 1 parts per million (ppm) by weight to about 1000 ppm by weight, may also be present. The fuels can also contain antiknock compounds such as methyl cyclopentadienylmanganese tricarbonyl and orthoazidophenol as well as co-antiknock compounds such as benzoyl acetone.

An effective amount of one or more compounds of Formula I are introduced into the combustion zone of the engine in a variety of ways to prevent build-up of deposits, or to accomplish the reduction of intake valve deposits or the modification of existing deposits that are related to octane requirement. As mentioned, a preferred method is to add a minor amount of one or more compounds of Formula I to the fuel. For example, one or more compounds of Formula I are added directly to the fuel or are blended with one or more carriers and/or one or more additional detergents to form an additive concentrate which can be added at a later date to the fuel.

The amount of aromatic amide-containing phenol alkoxylate compounds used will depend on the particular variation of Formula I used, the engine, the fuel, and the presence or absence of carriers and additional detergents. Generally, each compound of Formula I is added in an amount up to about 1000 ppm by weight, especially from about 1 ppm by weight to about 600 ppm by weight based on the total weight of the fuel composition. Preferably, the amount will be from about 50 ppm by weight to about 400 ppm by weight, and even more preferably from about 75 ppm by weight to about 250 ppm by weight based on the total weight of the fuel composition.

The carrier, when utilized, will have a weight average molecular weight from about 500 to about 5000. Suitable carriers, when utilized, include, but are not limited to, hydrocarbon based materials such as polyisobutylenes (PIB's), polypropylenes (PP's) and polyalphaolefins (PAO's); polyether based materials such as polybutylene oxides (poly BO's), polypropylene oxides (poly PO's), polyhexadecene oxides (poly HO's) and mixtures thereof (i.e., both (poly BO)+(poly PO) and (poly-BO-PO)); and mineral oils such as Exxon Naphthenic 900 sus and high viscosity index (HVI) oils. The carrier is preferably selected from PIB's, poly BO's, and poly PO's, with poly BO's being the most preferred.

The carrier concentration in the final fuel composition is up to about 1000 ppm by weight. When a carrier is present, the preferred concentration is from about 50 ppm by weight to about 400 ppm by weight, based on the total weight of the fuel composition. Once the carrier is blended with one or more compounds of Formula I, the blend is added directly to the fuel or packaged for future use.

The fuel compositions of the present invention may also contain one or more additional detergents. When additional detergents are utilized, the fuel composition will comprise a mixture of a major amount of hydrocarbons in the gasoline boiling range as described hereinbefore, a minor amount of one or more compounds of Formula I as described hereinbefore and a minor amount of an additional detergent selected from polyalkylenyl amines, Mannich amines, polyalkenyl succinimides, poly(oxyalkylene) carbamates, poly-(alkenyl)-N-substituted carbamates and mixtures thereof. As noted above, a carrier as described hereinbefore may also be included. As used herein, the term "minor amount" means less than about 10% by weight of the total fuel composition, preferably less than about 1% by weight of the total fuel composition and more preferably less than about 0.1% by weight of the total fuel composition.

The polyalkylenyl amine detergents utilized comprise at least one monovalent hydrocarbon group having at least 50 carbon atoms and at least one monovalent hydrocarbon group having at most five carbon atoms bound directly to separate nitrogen atoms of a diamine. Preferred polyalkylenyl amines are polyisobutenyl amines. Polyisobutenyl amines are known in the art and representative examples are disclosed in various U.S. Patents including U.S. Pat. Nos. 3,753,670, 3,756,793, 3,574,576 and U.S. Pat. No. 3,438,757, each incorporated herein by reference. Particularly preferred polyisobutenyl amines for use in the present fuel composition include N-polyisobutenyl-N',N'-dimethyl-1,3-diaminopropane (PIB-DAP) and OGA-472 (a polyisobutenyl ethylene diamine available commercially from Oronite).

The Mannich amine detergents utilized comprise a condensation product of a high molecular weight alkyl-substituted hydroxyaromatic compound, an amine which contains an amino group having at least one active hydrogen atom (preferably a polyamine), and an aldehyde. Such Mannich amines are known in the art and are disclosed in U.S. Pat. No. 4,231,759, incorporated herein by reference. Preferably, the Mannich amine is an alkyl substituted Mannich amine.

The polyalkenyl succinimide detergents comprise the reaction product of a dibasic acid anhydride with either a polyoxyalkylene diamine, a hydrocarbyl polyamine or mixtures of both. Typically the succinimide is substituted with the polyalkenyl group but the polyalkenyl group may be found on the polyoxyalkylene diamine or the hydrocarbyl polyamine. Polyalkenyl succinimides are also known in the art and representative examples are disclosed in various U.S. Patents including U.S. Pat. Nos. 4,810,261, 4,852,993, 4,968,321, 4,985,047, 5,061,291 and U.S. Pat. No. 5,147,414, each incorporated herein by reference.

The poly(oxyalkylene) carbamate detergents comprise an amine moiety and a poly(oxyalkylene) moiety linked together through a carbamate linkage, i.e.,

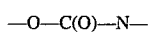  (XVIII)

These poly(oxyalkylene) carbamates are known in the art and representative examples are disclosed in various U.S. Patents including, U.S. Pat. Nos. 4,191,537, 4,160,648, 4,236,020, 4,270,930, 4,288,612 and U.S. Pat. No. 4,881,945, each incorporated herein by reference. Particularly preferred poly(oxyalkylene) carbamates for use in the present fuel composition include OGA-480 (a poly(oxyalkylene) carbamate which is available commercially from Oronite).

The poly(alkenyl)-N-substituted carbamate detergents utilized are of the formula:

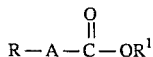  (XIX)

in which R is a poly(alkenyl) chain; $R^1$ is a hydrocarbyl or substituted hydrocarbyl group; and A is an N-substituted amino group. Poly(alkenyl)-N-substituted carbamates are known in the art and are disclosed in U.S. Pat. No. 4,936,868, incorporated herein by reference.

The one or more additional detergents are added directly to the hydrocarbons, blended with one or more carriers, blended with one or more compounds of Formula I, or blended with one or more compounds of Formula I and one or more carriers before being added to the hydrocarbons.

The concentration of the one or more additional detergents in the final fuel composition is generally up to about 1000 ppm by weight for each additional detergent. When one or more additional detergents are utilized, the preferred concentration for each additional detergent is from about 50 ppm by weight to about 400 ppm by weight, based on the total weight of the fuel composition, even more preferably from about 75 ppm by weight to about 250 ppm by weight, based on the total weight of the fuel composition.

Engine Tests

Decreasing Intake Valve Deposits

The invention further provides a process for the decreasing intake valve deposits in engines utilizing the aromatic amide-containing phenol alkoxylate compounds of present invention. The process comprises supplying to and combusting or burning in an internal combustion engine a fuel composition comprising a major amount of hydrocarbons in the gasoline boiling range and a minor amount of one or more compounds of Formula I as described hereinbefore.

By supplying to and combusting or burning the fuel composition in an internal combustion engine, deposits in the induction system, particularly deposits on the tulips of the intake valves, are reduced. The reduction is determined by running an engine with clean induction system components and pre-weighed intake valves on dynamometer test stands in such a way as to simulate road operation using a variety of cycles at varying speeds while carefully controlling specific operating parameters. The tests are run for a specific period of time on the fuel composition to be tested. Upon completion of the test, the induction system deposits are visually rated, the valves are reweighed and the weight of the valve deposits is determined.

Controlling Octane Requirement Increases

The invention further provides a process for controlling octane requirement increases in engines utilizing the aromatic amide-containing phenol alkoxylate compounds of the present invention. The process comprises supplying to and combusting or burning in an internal combustion engine a fuel composition comprising a major amount of hydrocarbons in the gasoline boiling range and a minor amount of one or more compounds of Formula I as described hereinbefore.

Octane requirement is the maximum octane number of a gasoline that presents trace knock in a given engine within the engine's normal operating range. An increase in octane requirement is generally experienced during mileage accumulation on a new engine. The increase is typically attributed to an increase in engine deposits. Octane requirement increase control is a performance feature that is usually expressed as a comparison of the octane requirement increase developed with a gasoline containing additives (test gasoline) relative to a version of the same gasoline without additives (base gasoline), i.e., the positive difference obtained by subtracting the results of gasoline containing additives from gasoline which does not contain additives.

The test protocol for octane requirement increase control must establish the stable octane requirement of the base gasoline relative to a clean engine. Base gasoline is typically the test gasoline without additives or special treatment; however, it may be gasoline containing additives for a specific comparison.

Octane requirement increase control testing consists of operating an engine assembled with clean combustion chambers and induction system components on a test gasoline to octane stabilization, measuring the octane requirement at regular intervals. The octane requirement increase control is the difference between the stabilized octane requirement of the engine operated on test gasoline and that of the stabilized octane requirement of the engine on base gasoline.

Reduction of Octane Requirement

The invention still further provides a process for reducing octane requirement in engines utilizing the aromatic amide-containing phenol alkoxylates of the present invention. The process comprises supplying to and combusting or burning in an internal combustion engine a fuel composition comprising a major amount of hydrocarbons in the gasoline boiling range and a minor amount of one or more compounds of Formula I as described hereinbefore.

Octane requirement reduction is the reduction of the octane requirement of an engine by the action of a particular gasoline, usually measured as a decrease from a stabilized octane requirement condition.

Octane requirement reduction is a performance feature that demonstrates a reduction from the established octane requirement of a base gasoline in a given engine. Octane requirement reduction testing consists of operating an engine, which has achieved stable octane requirement using base gasoline, on a test gasoline for approximately 100 hours. Octane measurements are made daily and octane requirement reduction is a reduction of octane requirement from that of base gasoline. Several octane requirement reduction tests may be conducted in a series for fuel to fuel comparison, or test fuel to base fuel comparison, by restabilizing on base fuel between octane requirement reduction tests.

The contribution of specific deposits is determined by removing deposits of interest and remeasuring octane requirement immediately after the engine is warmed to operating temperature. The octane requirement contribution of the deposit is the difference in ratings before and after deposit removal.

The ranges and limitations provided in the instant specification and claims are those which are believed to particularly point out and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be further described by the following examples which are provided for illustrative purposes only and are not to be construed as limiting the invention.

EXAMPLES

Compound Preparation

The aromatic amide-containing phenol alkoxylate compounds used in the following examples were prepared by reacting an initiator selected from salicylamide alcohols and salicylamides with epoxides in the presence of a potassium compound to produce compounds of Formula I having a weight average molecular weight from about 600 to about 4000. Weight average molecular weights (MW) were determined by gel permeation chromatography (GPC). Rotary evaporation under reduced pressure was typically conducted at a temperature from room temperature to 120° C. but higher temperatures may be employed.

EXAMPLE 1

Step 1: Preparation of Initiator Methyl salicylate (304 g, 2.0 moles) and methoxypropylamine (213 g, 2.4 moles) were added to an one-liter, 3-necked, round bottomed flask equipped with a thermal couple, temperature controller, heating device, nitrogen inlet, stirrer and Dean-Stark Trap. The mixture was heated under nitrogen atmosphere to 100° C.–110° C. for over 8 hours. During this process, methanol was generated and removed through the Dean-Stark Trap. The mixture was then cooled to room temperature prior to being subjected to rotary evaporation under reduced pressure at about 145° C. for 1 hour to remove trace amounts of light material. NMR analysis indicated a 91% yield of the desired aromatic amide initiator.

Step 2: Butoxylation of Initiator

A one-liter autoclave reactor equipped with a heating device, temperature controller, mechanical stirrer and water cooling system was charged with a mixture of the Initiator of Step 1 (67 g, 0.32 mole), potassium hydride (1.2 g) and 1,2-epoxybutane (435 g, 6.0 moles). The autoclave reactor was sealed, purged of air with nitrogen and then pressurized to 50 psi with nitrogen at room temperature. The mixture was heated to 137° C.–140° C. for 7 hours. During the reaction the pressure ranged from 358 psi to 272 psi. The autoclave reactor was cooled to room temperature and excess gas was vented. The resulting product was subjected to rotary evaporation under reduced pressure, extracted with water and subjected to rotary evaporation again to achieve a yellow liquid final product. GPC analysis showed MW=1210 and a polydispersity of 1.09. A hydroxy number of 77 mg KOH/g indicated dibutoxylation.

EXAMPLE 2

Step 1: Preparation of Initiator

A mixture of methyl salicylate (154 g, 1.0 mole) and 2-(2-aminoethoxy)ethanol (108 g, 1.03 mole) were placed in a glassware reactor setup such as that used in Step 1 of Example 1. The mixture was heated under nitrogen atmosphere to 150° C.–160° C. for 5 hours. The crude product was identified by infrared analysis and used without further purification.

Step 2: Butoxylation of Initiator

A mixture of the Initiator of Step 1 (70 g, 0.31 mole), potassium tert-butoxide (1.7 g) and toluene (30 g) was subjected to rotary evaporation under reduced pressure at 80° C. to remove tert-butanol. The resulting product and 1,2-epoxybutane (430 g, 6.0 moles) were charged directly into a one liter autoclave reactor equipped with a heating device, temperature controller, mechanical stirrer and water cooling system. The autoclave reactor was sealed, purged of air with nitrogen and then pressurized to 50 psi with nitrogen at room temperature. The mixture was heated to 138° C.–142° C. for 4 hours. During the reaction the pressure ranged from 364 psi to 283 psi. The autoclave reactor was cooled to room temperature and excess gas was vented. The resulting product was subjected to rotary evaporation under reduced pressure, extracted with water and subjected to rotary evaporation again. GPC analysis showed MW=1240 and a polydispersity of 1.15. A hydroxy number of 118 mg KOH/g and infrared absorption analysis of 1630 cm$^{-1}$ and 1720 cm$^{-1}$ indicated that the product was a tributoxylated structure.

EXAMPLE 3

Step 1: Preparation of Initiator

A mixture of methyl salicylate (152 g, 1.0 mole) and 2-(2-aminoethoxy)ethanol (105 g, 1.0 mole) was heated at 80° C.– 120° C. under nitrogen atmosphere for 8 hours in a glassware reactor setup such as that used in Step 1 of Example 1. During the process, methanol was generated and removed through the Dean-Stark trap. NMR analysis of the final product, a light-brown liquid, showed 86% aromatic amide and 12% unreacted salicylic acid.

Step 2: Butoxylation of Initiator

A mixture of the Initiator of Step 1 (84 g, 0.37 mole), potassium hydroxide (2.1 g in 2.0 g water) and toluene (50 g) was subjected to rotary evaporation under reduced pressure at 80° C. and then charged along with 1,2-epoxybutane (516 g, 7.2 moles) into a one-liter autoclave reactor equipped with a heating device, temperature controller, mechanical stirrer and water cooling system. The autoclave reactor was sealed, purged of air with nitrogen and then pressurized to 50 psi with nitrogen at room temperature. The mixture was heated to 123° C.–130° C. for 5 hours. The autoclave reactor was cooled to room temperature and excess gas was vented. The resulting product was subjected to rotary evaporation under reduced pressure, extracted with water and rotary evaporation was repeated to give a light yellow liquid final product (486 g). GPC analysis showed MW=1320 and a polydispersity of 1.11.

EXAMPLE 4

A mixture of salicylamide (34 g, 0.25 mole) and potassium tert-butoxide (2.3 g) was subjected to rotary evaporation under reduced pressure at 80½ C. The resulting mixture was then charged along with 1,2-epoxybutane (366 g, 5.1 moles) into a one-liter autoclave reactor equipped with a heating device, temperature controller, mechanical stirrer and water cooling system. The autoclave reactor was sealed, purged of air with nitrogen and then pressurized to 50 psi with nitrogen at room temperature. The mixture was heated to 130½ C. for 6 hours. The autoclave reactor was cooled to room temperature and excess gas was vented. The crude product was subjected to rotary evaporation under reduced pressure, water extracted and rotary evaporation was repeated. A light yellow liquid final product (322 g) was achieved. GPC analysis showed MW=1310 and a polydispersity of 1.11.

EXAMPLE 5

Step 1: Preparation of Initiator

A mixture of methyl salicylate (152 g, 1.0 mole) and n-octylamine (129 g, 1.0 mole) was heated at 101½ C.–126½ C. under nitrogen atmosphere for 10 hours in a glassware reactor setup such as that used in Example 1. A white solid product was confirmed by NMR analysis.

Step 2: Butoxylation

The Initiator of Step 1 (93 g, 0.37 mole), potassium-tert-butoxide (3.4 g) and toluene (50 g) were subjected to rotary evaporation under reduced pressure at 80°. The mixture was then charged along with 1,2-epoxybutane (507 g, 7.0 moles) into a one-liter autoclave reactor equipped with a heating device, temperature controller, mechanical stirrer and water cooling system. The autoclave reactor was sealed, purged of air with nitrogen and then pressurized to 50 psi with nitrogen at room temperature. The mixture was heated to 120° C.–132° C. for 6 hours. The autoclave reactor was cooled to room temperature and excess gas was vented. The crude product was subjected to rotary evaporation under reduced pressure, water washed and rotary evaporation was repeated. A light brown final product (541 g) was obtained. GPC analysis showed MW=1240 and a polydispersity of 1.13.

EXAMPLE 6

Salicylanilide (53 g, 0.25 mole), 1,2-epoxybutane (347 g, 4.8 moles) and potassium tert-butoxide (2.3 g) were directly charged into a one liter autoclave equipped with a heating device, temperature controller, mechanical stirrer and water cooling system. The autoclave reactor was sealed, purged of air with nitrogen and then pressurized to 50 psi with nitrogen at room temperature. The mixture was heated to 120° C.–140° C. for 12 hours. The autoclave reactor was cooled to room temperature and excess gas was vented. The crude product was subjected to rotary evaporation, water washed and subjected to rotary evaporation again. A brown liquid final product was obtained. GPC analysis showed MW=1390 and a polydispersity of 1.38.

COMPARATIVE EXAMPLE A

Step 1: Preparation of Initiator

A mixture of methyl salicylate (228 g, 1.5 moles) and 3dimethylaminopropylamine (DAP, 153 g, 1.5 moles) was heated to 100° C.–115° C. for 7 hours under a nitrogen atmosphere in a glassware setup such as that in Step 1 of Example 1. A yellow liquid product was obtained.

Step 2: Butoxylation of Initiator

A mixture of the Initiator of Step 1 (83 g, 0.37 mole) and potassium hydroxide (1.7 g in 1.7 g water) were subjected to rotary evaporation under reduced pressure at 80° C. and then charged along with 1,2-epoxybutane (517 g, 7.2 moles) into a one-liter autoclave reactor equipped with a heating device, temperature controller, mechanical stirrer and water cooling system. The autoclave reactor was sealed, purged of air with nitrogen and then pressurized to 50 psi with nitrogen at room temperature. The mixture was heated to 145° C. for 8 hours. The autoclave reactor was then cooled to room temperature and excess gas was vented. The crude product obtained was subjected to rotary evaporation under reduced pressure, washed with water and rotary evaporation was repeated to achieve a brown liquid final product (534 g). GPC analysis showed a bimodel distribution Mw=1040 and a polydispersity of 1.22.

COMPARATIVE EXAMPLE B

Methyl salicylate (456 g, 3.0 moles) and dicyclohexylamine (a secondary amine) (543 g, 3.0 moles) were added to the same type of glassware reactor setup as used in Step 1 of Example 1. The mixture was heated under nitrogen atmosphere to 180° C. for 3 hours and 193°–209° C. for 6 hours. The mixture was cooled at room temperature and a semisolid material was obtained. NMR analysis indicated that a significant amount of phenol (a decarboxylation side product) was produced. The desired amide product was only 14%. This result demonstrated that the desired aromatic amide containing phenol from the reactor of a secondary amine and salicylate can not be prepared under these reaction conditions described.

COMPARATIVE EXAMPLE C

Methyl salicylate (407 g, 2.68 moles) and morpholine (233 g, 2.68 moles) were added to the same type of glassware reactor setup as used in Step 1 of Example 1. The mixture was heated under nitrogen atmosphere to 129° C.–147° C. for approximately 4 hours. NMR analysis of the crude product showed only 19% desired amide, 4% unreacted salicylate and mostly side products. These results again indicate that making an amide from a secondary amine is difficult.

TEST RESULTS

In each of the following tests, the base fuel utilized comprised either premium unleaded gasoline (PU) (90+ octane, [R+M/2]) and/or regular unleaded gasoline (RU) (85–88 octane, [R+M/2]). Those skilled in the art will recognize that fuels containing heavy catalytically cracked stocks, such as most regular fuels, are typically more difficult to additize in order to control deposits and effectuate octane requirement reduction and octane requirement increase control. The aromatic amide-containing phenol compounds utilized were prepared as indicated by Example number and were used at the concentration indicated in ppm by weight. The tests employed are described below and the results of the various tests are set forth in the tables below.

Intake Valve Deposit Tests

Engines from vehicles were installed in dynamometer cells in such a way as to simulate road operation using a cycle of idle, low speed and high speed components while carefully controlling specific operating parameters. Fuels with and without the compounds of Formula I were tested in 3.3 L Dodge and 2.3 L Ford engines having port fuel injection including to determine the effectiveness of the present compounds in reducing intake valve deposits ("L" refers to liter). Carbureted 0,359 L Honda generator engines were also utilized to determine the effectiveness of the present compounds in reducing intake valve deposits.

Before each test, the engine was inspected, the induction system components were cleaned and new intake valves were weighed and installed. The oil was changed and new oil and fuel filters, gaskets and spark plugs were installed.

In all engines except the Honda, the tests were run in cycles consisting of idle, 35 mph and 65 mph for a period of 100 hours unless indicated otherwise. In the Honda engines, the tests were run in cycles consisting of a no load idle mode for one minute followed by a three minute mode with a load at 2200 rpm's for a period of 40 hours unless indicated otherwise. At the end of each test, the intake valves were removed and weighed.

All tests were carried out with additive concentrations (the amount of Compound Example #0 used) of 200 parts per million (ppm) non-volatile matter (nvm). Base fuel results which have 0 ppm additive compound are also included for comparison. The base fuels are indicated by the absence of a Compound Example # (indicated in the Compound Example # column by "—").

TABLE 2

| Intake Valve Deposits in Honda Generator Engines | | | |
|---|---|---|---|
| Compound Example # | Fuel | Concentration ppm By Wt. | Engine | Avg. Deposit Wt. (mg) |
| 3 | RU | 200 | H2C | 25.8 |
| — | " | 0 | * | 45.9 |
| 1 | PU | 200 | H3A | 7.8 |
| — | " | 0 | " | 24.4 |
| 1 | PU | 200 | H3B | 29.5 |
| — | " | 0 | ** | 60.3 |
| 1 | PU | 200 | H3B | 39.7 |
| — | " | 0 | ** | 60.3 |
| 2 | PU | 200 | H4A | 13.0 |
| — | " | 0 | " | 17.3 |
| 4 | PU | 200 | H3B | 30.3 |
| — | " | 0 | ** | 60.3 |
| 4 | PU | 200 | H4B | 19.2 |
| — | " | 0 | " | 63.0 |
| 6 | RU | 200 | H2C | 40.0 |
| — | " | 0 | * | 45.9 |

\* Indicates that this was an average of 4 runs in the same base fuel in other Honda generator engines.
\*\* Indicates that this was an average of 4 runs in the same base fuel in other Honda generator engines.
— Indicates the result achieved with base fuel in the absence of any additive compound (0 ppm additive compound).

TABLE 3

Intake Valve Deposits in Various Engines

| Compound Example # | Engine | Fuel | Concentration ppm By Wt. | Avg. Deposit Wt. (mg) |
|---|---|---|---|---|
| 3 | 3.0 L DODGE | PU | 200 | 143.1 |
| — | 3.0 L DODGE | * | 0 | 250.0 |
| A | 3.0 L DODGE | PU | 200 | 224.5 |
| — | 3.0 L DODGE | * | 0 | 250.0 |
| 1 | 2.3 L FORD | RU | 200 | 132.4 |
| — | 2.3 L FORD | " | 0 | 242.5 |
| 1 | 2.3 L FORD | PU | 200 | 100.3 |
| — | 2.3 L FORD | " | 0 | 154.1 |
| 1 | 3.3 L DODGE | PU | 200 | 91.3 |
| — | 3.3 L DODGE | " | 0 | 350.9 |
| 5 | 3.3 L DODGE | PU | 200 | 160.7 |
| — | 3.3 L DODGE | " | 0 | 350.9 |

— Indicates the results achieved with base fuel in the absence of any additive compound (0 ppm additive compound).
* Indicates that this was an average of 3 similar base fuels in the same engine.

What is claimed is:

1. A fuel composition comprising a mixture of a major amount of hydrocarbons in the gasoline boiling range and a minor amount of an additive compound having the formula:

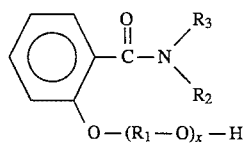

wherein each $R_1$ is independently selected from the group consisting of hydrocarbyl of 2 to 100 carbon atoms and substituted hydrocarbyl of 2 to 100 carbon atoms; $R_2$ and $R_3$ are each independently selected from the group consisting of hydrocarbyl of 1 to 100 carbon atoms, substituted hydrocarbyl of 1 to 100 carbon atoms and polyoxyalkylene alcohol of 2 to 200 carbon atoms with the proviso that at least one of $R_2$ and $R_3$ must be polyoxyalkylene alcohol; x is from 1 to 50 and the weight average molecular weight of the additive compound is at least about 600.

2. The fuel composition of claim 1 wherein said additive compound is present in an amount from about 50 ppm by weight to about 400 ppm by weight of the fuel composition.

3. The fuel composition of claim 2 wherein the weight average molecular weight of the additive compound is from about 800 to about 4000.

4. The fuel composition of claim 3 wherein each $R_1$ is independently selected from the group consisting of hydrocarbyl of 2 to 50 carbon atoms and substituted hydrocarbyl of 2 to 50 carbon atoms.

5. The fuel composition of claim 4 wherein $R_1$ is hydrocarbyl of the formula:

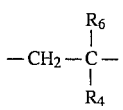

wherein each $R_4$ and $R_6$ are independently selected from the group consisting of hydrogen, hydrocarbyl of 1 to 18 carbon atoms and substituted hydrocarbyl of 1 to 18 carbon atoms.

6. The fuel composition of claim 4 wherein $R_1$ is hydrocarbyl of the formula:

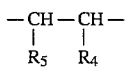

wherein each $R_4$ and $R_5$ are independently selected from the group consisting of hydrogen, hydrocarbyl of 1 to 18 carbon atoms and substituted hydrocarbyl of 1 to 18 carbon atoms.

7. The fuel composition of claim 5 wherein $R_3$ is polyoxyalkylene alcohol of the formula:

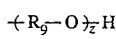

wherein each $R_9$ is independently selected from the group consisting of hydrocarbyl of 2 to 100 carbon atoms and substituted hydrocarbyl of 2 to 100 carbon atoms and z is from 1 to 50.

8. The fuel composition of claim 7 wherein each $R_9$ is independently selected from the group consisting of hydrocarbyl of 2 to 50 carbon atoms and substituted hydrocarbyl of 2 to 50 carbon atoms.

9. The fuel composition of claim 7 wherein each $R_9$ is hydrocarbyl of the formula:

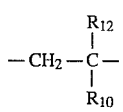

wherein each $R_{10}$ and $R_{12}$ is independently selected from the group consisting of hydrogen, hydrocarbyl of 1 to 18 carbon atoms and substituted hydrocarbyl of 1 to 18 carbon atoms.

10. The fuel composition of claim 9 wherein each $R_6$ is hydrogen; each $R_4$ is independently selected from the group consisting of hydrogen and hydrocarbyl comprising alkyl of 1 to 2 carbon atoms; each $R_{12}$ is hydrogen; each $R_{10}$ is selected from the group consisting of hydrogen and hydrocarbyl comprising alkyl of 1 to 2 carbon atoms; x is from 1 to 26; and z is from 1 to 26.

11. The fuel composition of claim 9 wherein $R_9$ is hydrocarbyl of the formula:

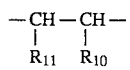

wherein each $R_{10}$ and $R_{11}$ is independently selected from the group consisting of hydrogen, hydrocarbyl of 1 to 18 carbon atoms and substituted hydrocarbyl of 1 to 18 carbon atoms.

12. The fuel composition of claim 9 wherein $R_2$ is selected from the group consisting of hydrocarbyl comprising alkyl of 1 to 20 carbon atoms, aromatics of 6 to 20 carbon atoms, polyoxyalkyl of 1 to 50 carbon atoms and polyoxyalkylene alcohol of the formula:

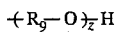

wherein each $R_9$ is independently selected from the group consisting of hydrocarbyl of 2 to 100 carbon atoms and substituted hydrocarbyl of 2 to 100 carbon atoms and z is from 1 to 50.

13. The fuel composition of claim 12 wherein $R_2$ is an aromatic of 6 carbon atoms.

14. The fuel composition of claim 13 wherein each $R_6$ is hydrogen; each $R_4$ is independently selected from the group consisting of hydrogen and hydrocarbyl comprising alkyl of 1 to 2 carbon atoms; each $R_{12}$ is hydrogen; each $R_{10}$ is selected from the group consisting of hydrogen and hydrocarbyl comprising alkyl of 1 to 2 carbon atoms; x is from 1 to 26; and z is from 1 to 26.

15. The fuel composition of claim 12 wherein $R_2$ is alkyl of 1 to 8 carbon atoms.

16. The fuel composition of claim 15 wherein each $R_6$ is hydrogen; each $R_4$ is independently selected from the group consisting of hydrogen and hydrocarbyl comprising alkyl of 1 to 2 carbon atoms; each $R_{12}$ is hydrogen; each $R_{10}$ is selected from the group consisting of hydrogen and hydrocarbyl comprising alkyl of 1 to 2 carbon atoms; x is from 1 to 26; and z is from 1 to 26.

17. The fuel composition of claim 12 wherein $R_2$ is polyoxyalkyl of the formula:

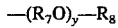

wherein each $R_7$ is independently selected from alkyl of 1 to 20 carbon atoms, $R_8$ is alkyl of 1 to 20 carbon atoms and y is from 1 to 50.

18. The fuel composition of claim 17 wherein each $R_7$ is alkyl of 3 carbon atoms, $R_8$ is alkyl of 1 carbon atom and y is 1.

19. The fuel composition of claim 18 wherein each $R_6$ is hydrogen; each $R_4$ is independently selected from the group consisting of hydrogen and hydrocarbyl comprising alkyl of 1 to 2 carbon atoms; each $R_{12}$ is hydrogen; each $R_{10}$ is selected from the group consisting of hydrogen and hydrocarbyl comprising alkyl of 1 to 2 carbon atoms; x is from 1 to 26; and z is from 1 to 26.

20. The fuel composition of claim 12 wherein $R_2$ is polyoxyalkylene alcohol and each $R_9$ is independently selected from hydrocarbyl of 2 to 50 carbon atoms and substituted hydrocarbyl of 2 to 50 carbon atoms.

21. The fuel composition of claim 20 wherein $R_9$ is hydrocarbyl of the formula:

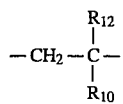

wherein each $R_{10}$ and $R_{12}$ is independently selected from the group consisting of hydrogen, hydrocarbyl of 1 to 18 carbon atoms and substituted hydrocarbyl of 1 to 18 carbon atoms.

22. The fuel composition of claim 21 wherein each $R_6$ is hydrogen; each $R_4$ is independently selected from the group consisting of hydrogen and hydrocarbyl comprising alkyl of 1 to 2 carbon atoms; each $R_{12}$ is hydrogen; each $R_{10}$ is selected from the group consisting of hydrogen and hydrocarbyl comprising alkyl of 1 to 2 carbon atoms; x is from 1 to 26; and each z is from 1 to 26.

23. A method for decreasing intake valve deposits in an internal combustion engine which comprises burning in said engine a fuel composition comprising a major amount of hydrocarbons in the gasoline boiling range and a minor amount of an additive compound having the formula:

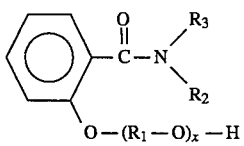

wherein each $R_1$ is independently selected from the group consisting of hydrocarbyl of 2 to 100 carbon atoms and substituted hydrocarbyl of 2 to 100 carbon atoms; $R_2$ and $R_3$ are each independently selected from the group consisting of hydrocarbyl of 1 to 100 carbon atoms, substituted hydrocarbyl of 1 to 100 carbon atoms and polyoxyalkylene alcohol of 2 to 200 carbon atoms with the proviso that at least one of $R_2$ and $R_3$ is polyoxyalkylene alcohol; x is from 1 to 50 and the weight average molecular weight of said additive compound is at least about 600.

24. The method of claim 23 wherein said additive compound is present in an amount from about 50 ppm by weight to about 400 ppm by weight of the fuel composition.

25. The method of claim 24 wherein the weight average molecular weight of the additive compound is from about 800 to about 4000.

26. The method of claim 25 wherein each $R_1$ is independently selected from the group consisting of hydrocarbyl of 2 to 50 carbon atoms and substituted hydrocarbyl of 2 to 50 carbon atoms.

27. The method of claim 26 wherein R, is hydrocarbyl of the formula:

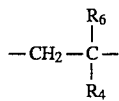

wherein each $R_4$ and $R_6$ are independently selected from the group consisting of hydrogen, hydrocarbyl of 1 to 18 carbon atoms and substituted hydrocarbyl of 1 to 18 carbon atoms.

28. The method of claim 26 wherein $R_1$ is hydrocarbyl of the formula:

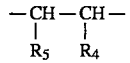

wherein each $R_4$ and $R_5$ are independently selected from the group consisting of hydrogen, hydrocarbyl of 1 to 18 carbon atoms and substituted hydrocarbyl of 1 to 18 carbon atoms.

29. The method of claim 27 wherein $R_3$ is polyoxyalkylene alcohol of the formula:

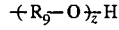

wherein each $R_9$ is independently selected from the group consisting of hydrocarbyl of 2 to 100 carbon atoms and substituted hydrocarbyl of 2 to 100 carbon atoms and z is from 1 to 50.

30. The method of claim 29 wherein each $R_9$ is independently selected from the group consisting of hydrocarbyl of 2 to 50 carbon atoms and substituted hydrocarbyl of 2 to 50 carbon atoms.

31. The method of claim 29 wherein each $R_9$ is hydrocarbyl of the formula:

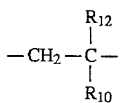

wherein each $R_{10}$ and $R_{12}$ is independently selected from the group consisting of hydrogen, hydrocarbyl of 1 to 18 carbon atoms and substituted hydrocarbyl of 1 to 18 carbon atoms.

32. The method of claim 31 wherein each $R_6$ is hydrogen; each $R_4$ is independently selected from the group consisting of hydrogen and hydrocarbyl comprising alkyl of 1 to 2 carbon atoms; each $R_{12}$ is hydrogen; each $R_{10}$ is selected from the group consisting of hydrogen and hydrocarbyl comprising alkyl of 1 to 2 carbon atoms; x is from 1 to 26; and z is from 1 to 26.

33. The method of claim 31 wherein $R_9$ is hydrocarbyl of the formula:

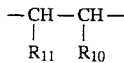

wherein each $R_{10}$ and $R_{11}$, is independently selected from the group consisting of hydrogen, hydrocarbyl of 1 to 18 carbon atoms and substituted hydrocarbyl of 1 to 18 carbon atoms.

34. The method of claim 31 wherein $R_2$ is selected from the group consisting of hydrocarbyl comprising alkyl of 1 to 20 carbon atoms, aromatics of 6 to 20 carbon atoms, polyoxyalkyl of 1 to 50 carbon atoms and polyoxyalkylene alcohol of the formula:

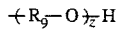

wherein each $R_9$ is independently selected from the group consisting of hydrocarbyl of 2 to 100 carbon atoms and substituted hydrocarbyl of 2 to 100 carbon atoms and z is from 1 to 50.

35. The method of claim 34 wherein $R_2$ is an aromatic of 6 carbon atoms.

36. The method of claim 35 wherein each $R_6$ is hydrogen; each $R_4$ is independently selected from the group consisting of hydrogen and hydrocarbyl comprising alkyl of 1 to 2 carbon atoms; each $R_{12}$ is hydrogen; each $R_{10}$ is selected from the group consisting of hydrogen and hydrocarbyl comprising alkyl of 1 to 2 carbon atoms; x is from 1 to 26; and z is from 1 to 26.

37. The method of claim 34 wherein $R_2$ is alkyl of 1 to 8 carbon atoms.

38. The method of claim 37 wherein each $R_6$ is hydrogen; each $R_4$ is independently selected from the group consisting of hydrogen and hydrocarbyl comprising alkyl of 1 to 2 carbon atoms; each $R_{12}$ is hydrogen; each $R_{10}$ is selected from the group consisting of hydrogen and hydrocarbyl comprising alkyl of 1 to 2 carbon atoms; x is from 1 to 26; and z is from 1 to 26.

39. The method of claim 34 wherein $R_2$ is polyoxyalkyl of the formula:

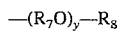

wherein each $R_7$ is independently selected from alkyl of 1 to 20 carbon atoms, $R_8$ is alkyl of 1 to 20 carbon atoms and y is from 1 to 50.

40. The method of claim 39 wherein each $R_7$ is alkyl of 3 carbon atoms, $R_8$ is alkyl of 1 carbon atom and y is 1.

41. The method of claim 40 wherein each $R_6$ is hydrogen; each $R_4$ is independently selected from the group consisting of hydrogen and hydrocarbyl comprising alkyl of 1 to 2 carbon atoms; each $R_{12}$ is hydrogen; each $R_{10}$ is selected from the group consisting of hydrogen and hydrocarbyl comprising alkyl of 1 to 2 carbon atoms; x is from 1 to 26; and z is from 1 to 26.

42. The method of claim 34 wherein $R_2$ is polyoxyalkylene alcohol and each $R_9$ is independently selected from hydrocarbyl of 2 to 50 carbon atoms and substituted hydrocarbyl of 2 to 50 carbon atoms.

43. The method of claim 42 wherein $R_9$ is hydrocarbyl of the formula:

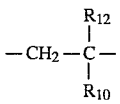

wherein each $R_{10}$ and $R_{12}$ is independently selected from the group consisting of hydrogen, hydrocarbyl of 1 to 18 carbon atoms and substituted hydrocarbyl of 1 to 18 carbon atoms.

44. The method of claim 43 wherein each $R_6$ is hydrogen; each $R_4$ is independently selected from the group consisting of hydrogen and hydrocarbyl comprising alkyl of 1 to 2 carbon atoms; each $R_{12}$ is hydrogen; each $R_{10}$ is selected from the group consisting of hydrogen and hydrocarbyl comprising alkyl of 1 to 2 carbon atoms; x is from 1 to 26; and each z is from 1 to 26.

45. A method for controlling octane requirement increase in an internal combustion engine which comprises burning in said engine a fuel composition comprising a major amount of hydrocarbons in the gasoline boiling range and a minor amount of an additive compound having the formula:

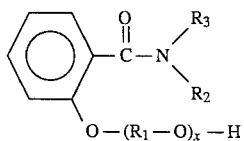

wherein each $R_1$ is independently selected from the group consisting of hydrocarbyl of 2 to 100 carbon atoms and substituted hydrocarbyl of 2 to 100 carbon atoms; $R_2$ and $R_3$ are each independently selected from the group consisting of hydrocarbyl of 1 to 100 carbon atoms, substituted hydrocarbyl of 1 to 100 carbon atoms and polyoxyalkylene alcohol of 2 to 200 carbon atoms with the proviso that at least one of $R_2$ and $R_3$ is polyoxyalkylene alcohol; x is from 1 to 50 and the weight average molecular weight of the additive compound is at least about 600.

46. A method for reducing octane requirement increase in an internal combustion engine which comprises burning in said engine a fuel composition comprising a major amount of hydrocarbons in the gasoline boiling range and a minor amount of an additive compound having the formula:

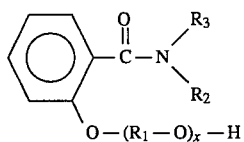

wherein each $R_1$ is independently selected from the group consisting of hydrocarbyl of 2 to 100 carbon atoms and substituted hydrocarbyl of 2 to 100 carbon atoms; $R_2$ and $R_3$ are each independently selected from the group consisting of hydrocarbyl of 1 to 100 carbon atoms, substituted hydrocarbyl of 1 to 100 carbon atoms and polyoxyalkylene alcohol of 2 to 200 carbon atoms with the proviso that at least one of $R_2$ and $R_3$ is polyoxyalkylene alcohol; x is from 1 to 50 and the weight average molecular weight of the additive compound is at least about 600.

47. A compound of the formula:

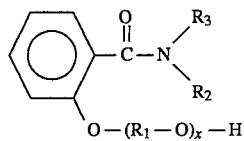

wherein each $R_1$ is independently selected from the group consisting of hydrocarbyl of 2 to 100 carbon atoms and substituted hydrocarbyl of 2 to 100 carbon atoms; $R_2$ and $R_3$ are each independently selected from the group consisting of hydrocarbyl of 1 to 100 carbon atoms, substituted hydrocarbyl of 1 to 100 carbon atoms and polyoxyalkylene alcohol of 2 to 200 carbon atoms with the proviso that at least one of $R_2$ and $R_3$ is polyoxyalkylene alcohol; x is from 1 to 50 and the weight average molecular weight of the additive compound is at least about 600.

48. A fuel composition comprising a mixture of:

(a) a major amount of hydrocarbons in the gasoline boiling range;

(b) a minor amount of an additive compound having the formula:

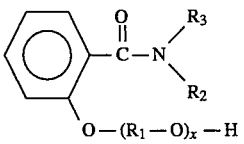

wherein each $R_1$ is independently selected from the group consisting of hydrocarbyl of 2 to 100 carbon atoms and substituted hydrocarbyl of 2 to 100 carbon atoms; $R_2$ and $R_3$ are each independently selected from the group consisting of hydrocarbyl of 1 to 100 carbon atoms, substituted hydrocarbyl of 1 to 100 carbon atoms and polyoxyalkylene alcohol of 2 to 200 carbon atoms with the proviso that at least one of $R_2$ and $R_3$ is polyoxyalkylene alcohol; x is from 1 to 50 and the weight average molecular weight of the additive compound is at least about 600; and (c) a minor amount of an additional detergent selected from the group consisting of polyalkylenyl amines, mannich amines, polyalkenyl succinimides, poly(oxyalkylene) carbamates, poly(alkenyl)-N-substituted carbamates and mixtures thereof.

* * * * *